United States Patent
Johnson (10) Patent No.: US 8,621,425 B1
(45) Date of Patent: *Dec. 31, 2013

(54) GENERATING CODE BASED AT LEAST ON ONE OR MORE OUTPUT ARGUMENTS DESIGNATED AS NOT BEING PRESENT

(75) Inventor: Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 726 days.

This patent is subject to a terminal disclaimer.

(21) Appl. No.: 12/686,482

(22) Filed: Jan. 13, 2010

Related U.S. Application Data (63) Continuation-in-part of application No. 12/570,516, filed on Sep. 30, 2009, now Pat. No. 8,112,741, which is a continuation of application No. 11/102,532, filed on Apr. 8, 2005, now Pat. No. 7,673,289.

(51) Int. Cl.
*G06F 9/44* (2006.01)
(52) U.S. Cl.
USPC .......................................................... 717/106
(58) Field of Classification Search
USPC .......................................................... 717/106
See application file for complete search history.

(56) References Cited

U.S. PATENT DOCUMENTS

| | | | | |
|---|---|---|---|---|
| 5,307,493 | A * | 4/1994 | Gusenius | 717/123 |
| 5,742,738 | A | 4/1998 | Koza et al. | |
| 6,058,385 | A | 5/2000 | Koza et al. | |
| 6,766,348 | B1 | 7/2004 | Combs et al. | |
| 7,414,626 | B1 | 8/2008 | Picott | |
| 7,454,659 | B1 * | 11/2008 | Gaudette et al. | 714/33 |
| 7,454,746 | B2 * | 11/2008 | Micco et al. | 717/137 |
| 2002/0069400 | A1 * | 6/2002 | Miloushev et al. | 717/108 |
| 2003/0056203 | A1 | 3/2003 | Micco et al. | |
| 2003/0149799 | A1 | 8/2003 | Shattuck et al. | |
| 2004/0006762 | A1 | 1/2004 | Stewart et al. | |
| 2007/0150871 | A1 | 6/2007 | Barsness et al. | |
| 2007/0283331 | A1 * | 12/2007 | Pietrek | 717/130 |
| 2008/0021951 | A1 * | 1/2008 | Lurie et al. | 709/202 |
| 2008/0098349 | A1 * | 4/2008 | Lin et al. | 717/106 |
| 2008/0295080 | A1 * | 11/2008 | Shinomi | 717/127 |

OTHER PUBLICATIONS

"MATLAB: The Language of Technical Computing," Programming Version 7, The MathWorks, Inc., Mar. 2005, pp. i-xx, 4-1 to 4-44, 5-1 to 5-34, Index-1 to Index-24.
Jarvi, "Proposal for Adding Tuple Types into the Standard Library," Indiana University, Sep. 10, 2002, all pages.
"MATLAB C++ Math Library," The MathWorks, Inc., Jan. 1999, all pages.
U.S. Appl. No. 12/570,516, filed Sep. 30, 2009 by Steve Johnson for Ignoring Output Arguments of Functions in Programming Environments, all pages.
U.S. Appl. No. 11/102,532, filed Apr. 8, 2005 by Steve Johnson for Ignoring Output Arguments of Functions in Programming Environments, all pages.
"Computer Science 1: Introductory Ada Summary," <http://www.seas.gwu.edu/~csci51/fal199/ada_note.html>, Sep. 1999, pp. 1-20.

* cited by examiner

*Primary Examiner* — Anna Deng
*Assistant Examiner* — Junchun Wu
(74) *Attorney, Agent, or Firm* — Cesari and McKenna, LLP; Michael R. Reinemann (57) ABSTRACT

In an embodiment, code may be acquired that calls a first function defined to return a plurality of output arguments. The code may designate, with a designator, one or more output arguments, in the plurality of output argument, that are not present. Processing logic may generate a second function based at least on the designated one or more output arguments being designated as not present.

27 Claims, 8 Drawing Sheets

```
IF ?A
        STATEMENTS INCLUDED WHEN OUTPUT PARAMETER PRESENT
ELSE
        STATEMENTS INCLUDED WHEN OUTPUT PARAMETER NOT PRESENT
```

FIG. 3A

```
IF_OUTPUT_PRESENT A
        STATEMENTS INCLUDED WHEN OUTPUT PARAMETER PRESENT
ELSE
        STATEMENTS INCLUDED WHEN OUTPUT PARAMETER NOT PRESENT
```

FIG. 3B

```
IF IS_OUTPUT_PRESENT ('A')
        STATEMENTS INCLUDED WHEN OUTPUT PARAMETER PRESENT
ELSE
        STATEMENTS INCLUDED WHEN OUTPUT PARAMETER NOT PRESENT
```

GENERATING CODE BASED AT LEAST ON ONE OR MORE OUTPUT ARGUMENTS DESIGNATED AS NOT BEING PRESENT

RELATED APPLICATIONS

This application is a continuation-in-part of U.S. patent application Ser. No. 12/570,516, titled "Ignoring Output Arguments of Functions in Programming Environments", filed Sep. 30, 2009, which is a continuation of U.S. patent application Ser. No. 11/102,532, titled "Ignoring Output Arguments of Functions in Programming Environments", filed Apr. 8, 2005. The above-identified patent applications are incorporated by reference in their entirety as though fully set forth herein.

BACKGROUND

Some languages, such as MATLAB® language, allow functions to return more than one value. For example, a function provided in MATLAB® programming environments may return both the eigenvalues and eigenvectors of a matrix, or an approximation function may return both the coefficients of the approximation and an estimate of the accuracy of the approximation. This feature is valuable in mathematical functions as well as more general situations.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
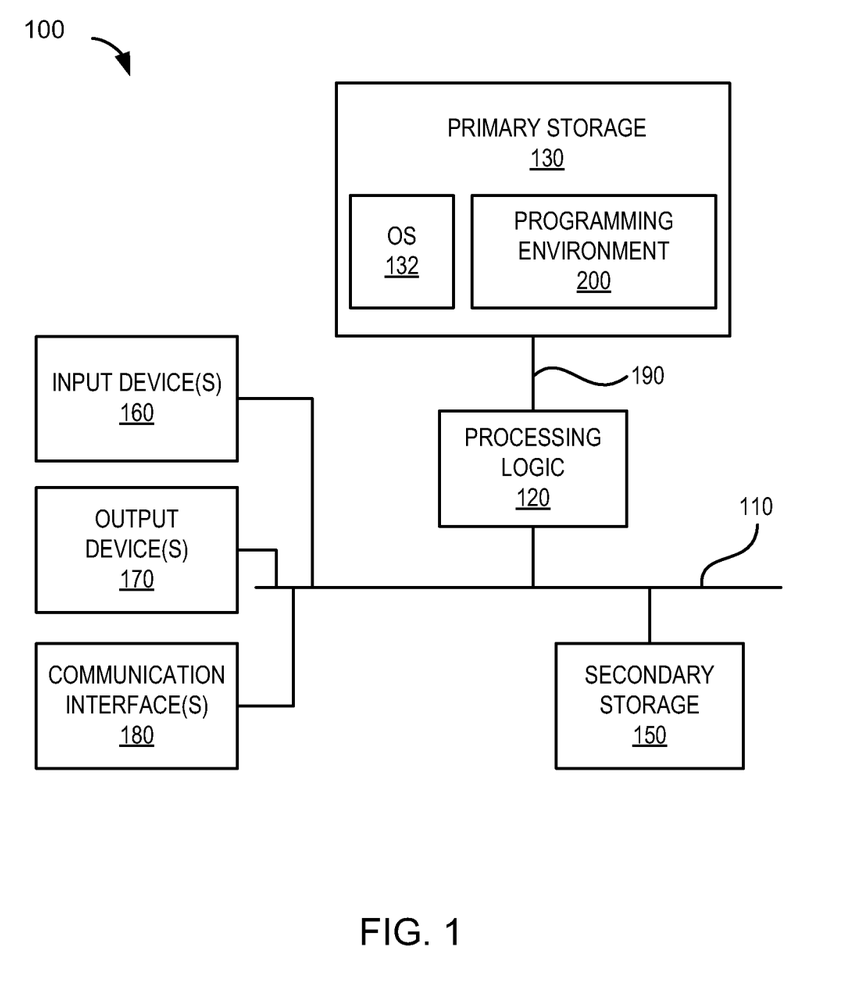
FIG. 1 illustrates an example of a computing device that may be used to practice one or more embodiments of the invention.

FIG. 1 illustrates an example of a computing device 100 that may be configured to implement one or more embodiments of the invention. Referring to FIG. 1, the computing device 100 may comprise one or more components including an input-output (I/O) bus 110, processing logic 120, primary storage 130, secondary storage 150, one or more input devices 160, one or more output devices 170, one or more communication interfaces 180, and a memory bus 190. Computing device 100 is one example of a computing device that may be configured to implement one or more embodiments of the invention. It should be noted that other computing devices that may be less complicated or more complicated than computing device 100 may be configured to implement one or more embodiments of the invention.

The I/O bus 110 may be an interconnect bus configured to enable communication among various components in the computing device 100, such as processing logic 120, secondary storage 150, input devices 160, output devices 170, and communication interfaces 180. The communication may include, among other things, transferring information (e.g., control information, data) among the components.

The memory bus 190 may be an interconnect bus configured to enable information to be transferred between the processing logic 120 and the primary storage 130. The information may include instructions and/or data that may be executed, manipulated, and/or otherwise processed by processing logic 120. The instructions and/or data may include instructions and/or data that are configured to implement one or more embodiments of the invention.

The processing logic 120 may include logic configured to interpret, execute, and/or otherwise process information contained in, for example, the primary storage 130 and/or secondary storage 150. The information may include instructions and/or data configured to implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. The processing logic 120 may comprise a single core or multiple cores. An example of a processor that may be used to implement processing logic 120 is the Intel Xeon processor available from Intel Corporation, Santa Clara, Calif.

The secondary storage 150 may be a tangible computer-readable media that is accessible to the processing logic 120 via I/O bus 110. For example, the processing logic 120 may store information in the secondary storage 150 by writing the information (e.g., data) to the secondary storage 150 via the I/O bus 110. Likewise, for example, the processing logic 120 may access information that is stored in the secondary storage 150 by reading the stored information from the secondary storage 150 via the I/O bus. The information may include information that may be executed, interpreted, manipulated, and/or otherwise processed by the processing logic 120.

The secondary storage 150 may comprise one or more storage devices, such as magnetic disk drives, optical disk drives, random-access memory (RAM) disk drives, flash drives, or other storage devices. Information may be stored on one or more tangible computer-readable media contained in the storage devices. Examples of tangible computer-readable media that may be contained in the storage devices may include magnetic discs, optical discs, and memory devices (e.g., flash memory devices, static RAM (SRAM) devices, dynamic RAM (DRAM) devices, or other memory devices).

The information may include data and/or computer-executable instructions that may implement one or more embodiments of the invention.

The input devices 160 may include one or more devices that may be used to input information into computing device 100. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 100 using, for example, using a pointing device, such as a computer mouse. The information may also include other forms of data, such as, for example, text that may be input using a keyboard.

The output devices 170 may include one or more devices that may output information from the computing device 100. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, or some other output device. The output devices 170 may be directed by, for example, the processing logic 120, to output the information from the computing device 100. The information may be presented (e.g., displayed, printed) by the output devices 170. The information may include, for example, graphical user interface (GUI) elements (e.g., windows, widgets, or other GUI elements), graphical representations, pictures, text, or other information that may be presented by the output devices 170.

The communication interfaces 180 may include logic configured to interface the computing device 100 with, for example, one or more communication networks and enable the computing device 100 to communicate with one or more entities connected to the networks. An example of a computer network that may be used with computing device 100 will be described further below with respect to FIG. 7.

The communication interfaces 180 may include one or more transceiver-like mechanisms that enable the computing device 100 to communicate with entities connected to the networks. The communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computing device 100 to the network.

The primary storage 130 may comprise one or more tangible computer-readable media configured to store information for processing logic 120. The primary storage 130 may be accessible to the processing logic 120 via bus 190. The information may include computer-executable instructions and/or data that may be configured to implement an operating system (OS) 132 and a programming environment 200. The instructions may be executed, interpreted, and/or otherwise processed by processing logic 120.

The primary storage 130 may comprise a RAM that may include one or more RAM devices configured to store information (e.g., data, executable instructions, or other information). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may be configured to implement various conventional operating system functions, such as, for example, (1) scheduling one or more portions of the programming environment 200 to run on the processing logic 120, (2) managing the primary storage 130, and (3) controlling access to various components in the computing device 100 (e.g., input devices 160, output devices 170, network interfaces 180, secondary storage 150) and information received/transmitted by these components. Examples of operating systems that may be used to implement OS 132 may include, but are not limited to, the Linux operating system, Microsoft Windows operating system, the Symbian operating system, Mac OS operating system, and the Android operating system. A version of the Linux operating system that may be used is Red Hat Linux, which is available from Red Hat Corporation, Raleigh, N.C. Versions of the Microsoft Windows operating system that may be used include Microsoft Windows 7, Microsoft Windows Vista, and Microsoft Windows XP operating systems, which are available from Microsoft Inc., Redmond, Wash. The Symbian operating system is available from Nokia Corporation, Espoo, Finland. The Mac OS operating system is available from Apple, Inc., Cupertino, Calif. The Android operating system is available from Google, Inc., Menlo Park, Calif.

Figure 2:
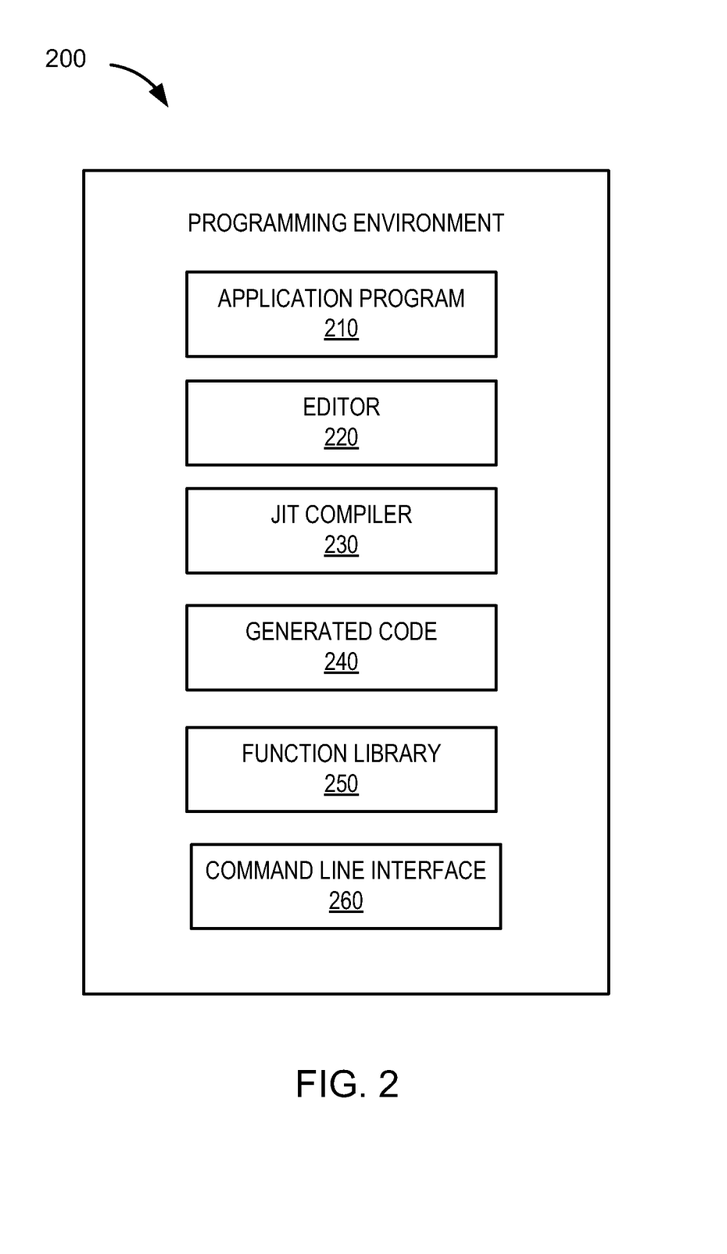
FIG. 2 illustrates an example of a programming environment that may implement one or more embodiments of the invention.

FIG. 2 illustrates an example of programming environment 200. Programming environment 200 may contain instructions, executable by processing logic 120, that may implement one or more embodiments of the invention. The programming environment 200 may include an application program 210, an editor 220, a just-in-time (JIT) compiler 230, generated code 240, function library 250, and command line interface 260. An example of a programming environment that may be used with one or more embodiments of the invention is MATLAB®, which is available from MathWorks, Inc., Natick, Mass. Note that other programming environments may be used with one or more embodiments of the invention. These other programming environments may include, for example, Eclipse from the Eclipse Foundation, Inc., Portland, Oreg.; Microsoft Visual Studio, from Microsoft Inc., Redmond, Wash.; and Java Software Development Kits (SDKs), from Sun Microsystems, Inc., Santa Clara, Calif.

The application program 210 may include statements (code) that may be specified by a user. The statements may be specified in a programming language, such as the MATLAB® programming language, which is available from MathWorks, Inc.

The application program 210 may include statements that may call various functions (call statements). The functions may be, for example, software functions, procedures, routines, subroutines, scripts, or macros. The functions may or may not take input arguments. Some functions may return multiple output arguments. As will be described further below, a call statement may be used to call a function that returns a plurality of output arguments. The call statement may include a designator that designates an output argument, in the plurality of output arguments, that is not present.

The editor 220 may be a software utility, which may be provided by the programming environment 200. The editor 220 may contain provisions for specifying statements for application program 210. The editor 220 may provide an interface, such as a graphical user interface (GUI) or a textual interface, which may be used to specify the statements. The editor 220 may enable the application program 210 to be saved in storage, such as primary storage 130 or secondary storage 150. The application program 210 may be saved in a file contained in the storage.

The JIT compiler 230 may be a just-in-time compiler that may compile the application program 210 to produce generated code 240. The generated code 240 may be, for example, bytecode, object code, executable code, or source code. The generated code 240 may be written in a particular language, such as, for example, C or C++.

The function library 250 may be a software library that contains one or more functions that may be called by the application program 210. The functions may include, for example, software functions, procedures, routines, scripts, and/or macros. The functions may be contained in the library 250, for example, as bytecode, object code, or source code. The function may be written in a particular language, such as, for example, C or C++.

The command line interface 260 provides an interface that may be used to interact with the programming environment 200. Certain commands may be supported by the programming environment 200, which may be entered using the command line interface 260. For example, the programming environment 200 may support a command, which may be used to compile the application program. The command may be entered via the command line interface 260 to cause the JIT compiler 230 to compile the application program 210 and produce generate code 240. In addition, functions provided by the programming environment 200 (e.g., functions contained in library 250) may be called using statements entered via the command line interface 260.

As noted above, application program 210 may include a call statement that calls a function that returns multiple output arguments. For example, application program 210 may include a call statement that calls a sort function that returns a sorted array and an index vector. The sort function may be defined as follows:

$[B,IX]=\text{sort}(A)$

Where:
A is an input vector to be sorted (e.g., a name of an array);
B is an output that is the sorted vector A (e.g., the sorted array); and
IX is an output that is an index vector, where size(IX)==size(A). If A is a vector, B=A(IX). If A is an m-by-n matrix, then each column of IX is a permutation vector of the corresponding column of A, such that
for j=1:n $B(:,j)=A(IX(:,j),j);$ end A designator may be used in the call statement to designate one or more output arguments of the function that are "not present". An output argument that is "not present" refers to an output argument that may be, for example, ignored or not returned. For example, an output argument that is designated as not present may be ignored by the caller of the function, regardless of whether the output argument is returned by the called function. Likewise, for example, an output argument that is designated as not present may not be returned by the called function.

The designator may be indicated by a text character. The following example code calls the above-described "sort" function using a tilde (~) character as a designator to indicate an output argument that is not present:

$[\sim,IX]=\text{sort}(A);$

In this example, the tilde (~) character indicates that the sorted vector "B" is not present. It should be noted that the tilde (~) character is an example of a designator that may be used to indicate an output argument is not present. Other designators, such as a bit vector or a number may be used. The number may indicate, for example, an ordinal position associated with the output argument. The ordinal position may be a position of the argument in a statement that calls the function. In this example, an ordinal position associated with the sorted vector "B" may be "1" and an ordinal position associated with the sorted index "IX" may be "2". Note that the exact choice of a designator may be a matter of, for example, language design.

The JIT compiler 230 may compile the application program 210 in the programming environment 200 and generate code 240. The generated code may be, for example, source code, bytecode, object code, or executable code. The JIT compiler 230 may compile the application program by acquiring (e.g., reading) statements contained in the application program 210 and compiling the statements into the generated code.

For example, the following statement may be contained in application program 210:

$[\sim,IX]=\text{sort}(A);$

The JIT compiler 230 may read this statement from the application program 210 and process the statement by generating function in generated code 240 that, when executed, generates and returns the index vector "IX" but does not return the sorted vector "A". Since the statement designates that output argument "B" (i.e., the sorted vector "A") is not present, the JIT compiler 230 may exclude code from the function that, when executed, would normally generate the sorted vector "A".

In addition to generating code, JIT compiler 230 may allocate various resources (e.g., space in primary storage 130 and/or secondary storage 150) for variables used by the application program 210. If a function is called in the application program 210, the JIT compiler 230 may allocate resources for the input and output arguments of the function. Resources may also be allocated for the variables used in the function. If as noted above, the function returns multiple output arguments and the application program 210 calls the function and designates that an output argument is not present, the JIT compiler 230 may omit allocating resources for the output argument that is designated as not present. Moreover, the JIT compiler 230 may generate code for the function that may omit allocating resources for the output argument or reclaim resources that have already been allocated for the output argument.

Figure 3A:
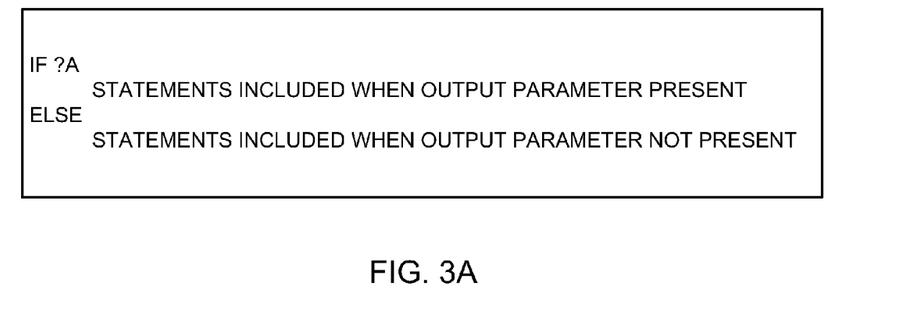
FIGS. 3A-C illustrate example statements that may be included in a function to determine whether a particular output argument associated with the function is present in a call to the function.
Figure 3B:
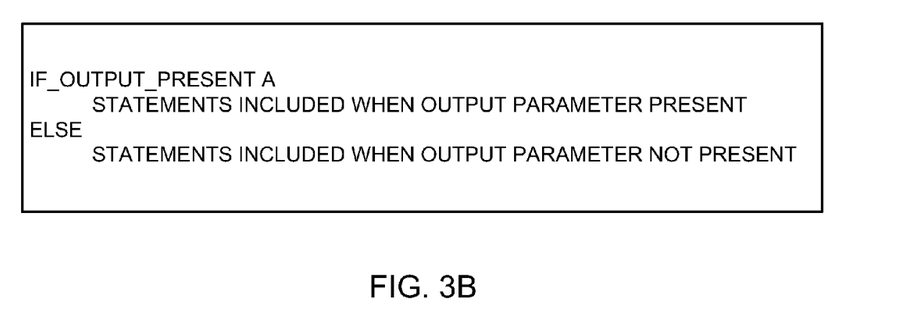
Figure 3C:
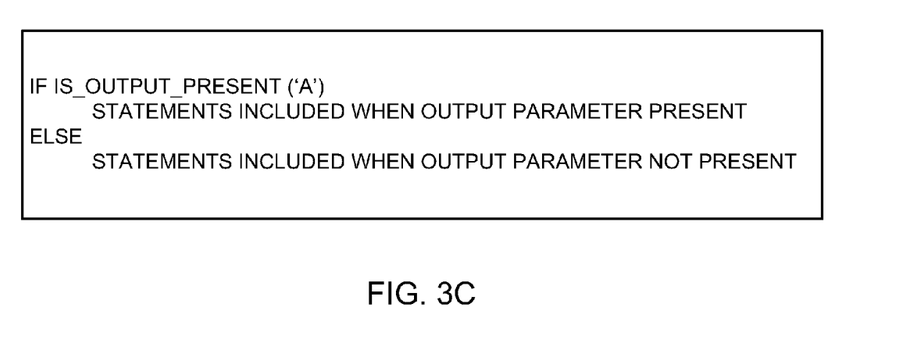

FIGS. 3A-C illustrate example statements that may be included in a first function to determine whether a particular output argument associated with the first function is present in a call to the first function. The statements may also indicate statements in the first function that may be included in or excluded from a second function based on an outcome of the above determination. The second function may be a function that is generated based on the first function and the output arguments designated as not present in the call to the first function. The second function may be referred to as a "clone" of the first function in that it may be identical to or may closely resemble the first function.

FIG. 3A illustrates example statements that uses expression syntax to determine if a output argument is present. The example statements may be included in a called function. The example statements include a statement "IF ?A". In this statement, the text "IF" is a reserved word that indicates that a condition is to be tested and the text "?A" indicates the condition to be tested.

Specifically, with regards to the condition to be tested, the text "?" is an operator that indicates that a presence of an output parameter, in a statement used to call the function, is to be tested to determine if the output parameter is present. The text "A" identifies the output parameter whose presence is to be tested. In this example, "A" is the name of the output parameter. Note that other ways of identifying the output parameter may be used. For example, a number or a bit vector may be used to indicate a position of the output parameter in the statement used to call the function. Also note that the operator may be indicated in other ways. For example, other text may be used to indicate the operator.

When processing the statement, the expression may be evaluated to determine if the condition is true or false and based on the output of the evaluation, statements from the first function may be included or excluded from the second function. For example, if the condition is true (i.e., the output parameter "A" is present in the call to the function), statements immediately following the condition up to the "ELSE" statement may be included in the second function that is generated from the first function. In addition, statements after the "ELSE" statement may be excluded from the second function.

Likewise, for example, if the condition is false (i.e., the output parameter "A" is designated as not present in the call to the function), statements immediately following the "ELSE" statement may be included in the second function while statements immediately following the condition to be tested up to the "ELSE" statement may be excluded from the second function.

FIG. 3B illustrates an example of a reserved word that may be used to test for the presence of an output argument in a statement that calls the first function. In this example, the reserved word is represented by the text "IF_OUTPUT_PRESENT". The text "A" identifies the output parameter whose presence is to be tested. As noted above, the output parameter may be identified using other ways.

The reserved word may be processed to determine if the identified output parameter is present. If the output parameter is present, statements following the identified output parameter up to the "ELSE" statement may be included in the second function and statements following the "ELSE" statement may be excluded from the second function. Likewise, if the output parameter is not present, statements immediately following the identified output parameter and up to the "ELSE" statement may be excluded from the second function and statements following the "ELSE" statement may be included in the second function.

FIG. 3C illustrates an example of using a routine to test for the presence of an output argument in a statement that calls the first function. Referring to FIG. 3C, the text "IF" is a reserved word that indicates that a condition is to be tested. The text "IS_OUTPUT_PRESENT('A')" calls a routine that tests for the presence of output parameter named "A". If "A" is present, the routine may return a value (e.g., a Boolean TRUE) to indicate that the output parameter is present. Likewise, if "A" is not present, the routine may return a value (e.g., a Boolean FALSE) to indicate the output parameter is not present.

If the routine returns a value that indicates the output parameter is present, statements immediately following the identified output parameter up to the "ELSE" statement may be included in the second function and statements following the "ELSE" statement may be excluded from the second function. Likewise, if the routine returns a value that indicates the output parameter is not present, statements immediately following the identified output parameter and up to the "ELSE" statement may be excluded from the second function and statements immediately following the "ELSE" statement may be included in the second function.

Note that FIGS. 3A-C, the "ELSE" statement and statements following the "ELSE" statement may be optional.

In an embodiment, code may be acquired (e.g., read) that calls a first function defined to return a plurality of output arguments. The acquired code may designate, with a designator (e.g., a tilde (~) character), one or more output arguments, in the plurality of output arguments, that are not present. A second function may be generated (e.g., using processing logic, such as processing logic 120 based at least on the designated one or more output arguments being designated as not present.

Figure 4A:
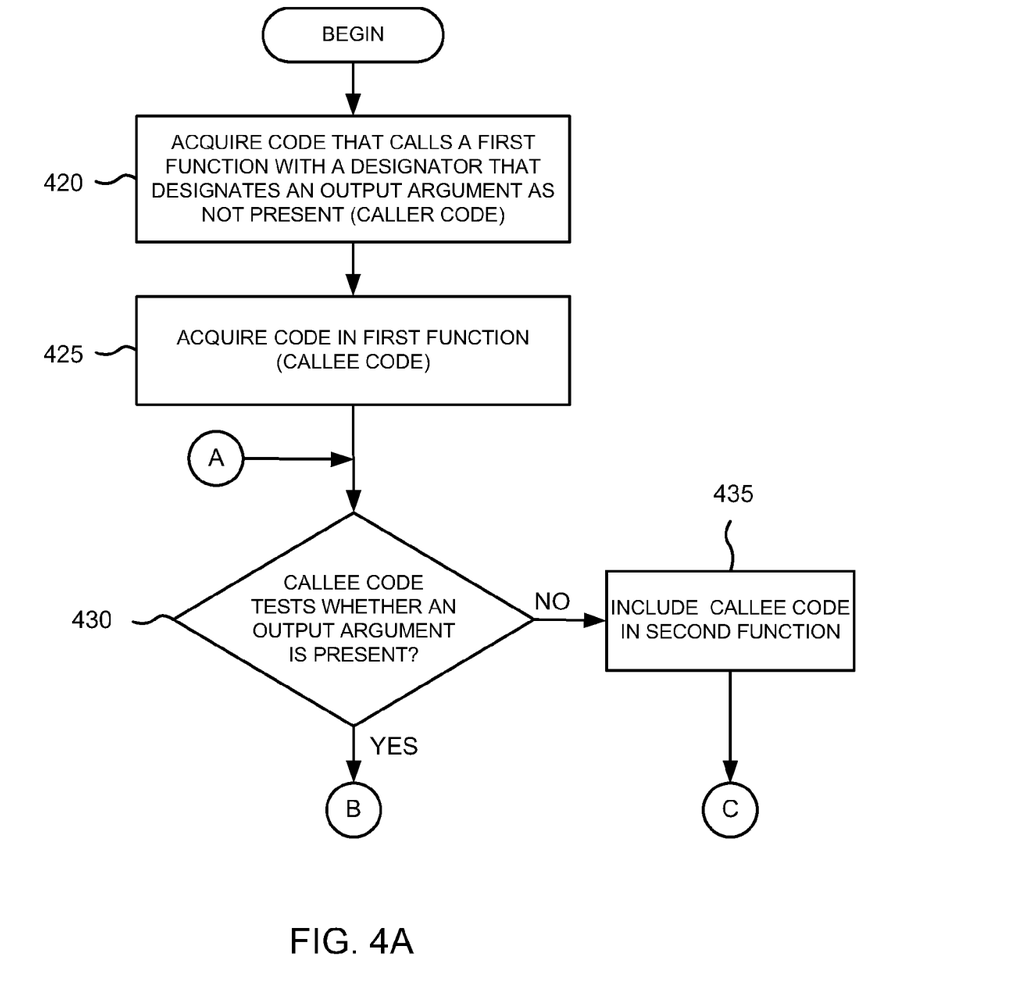
FIGS. 4A-B illustrate a flow chart of example acts that may be used to acquire a statement that calls a first function and generate a second function based on the acquired statement and the first function.
Figure 4B:
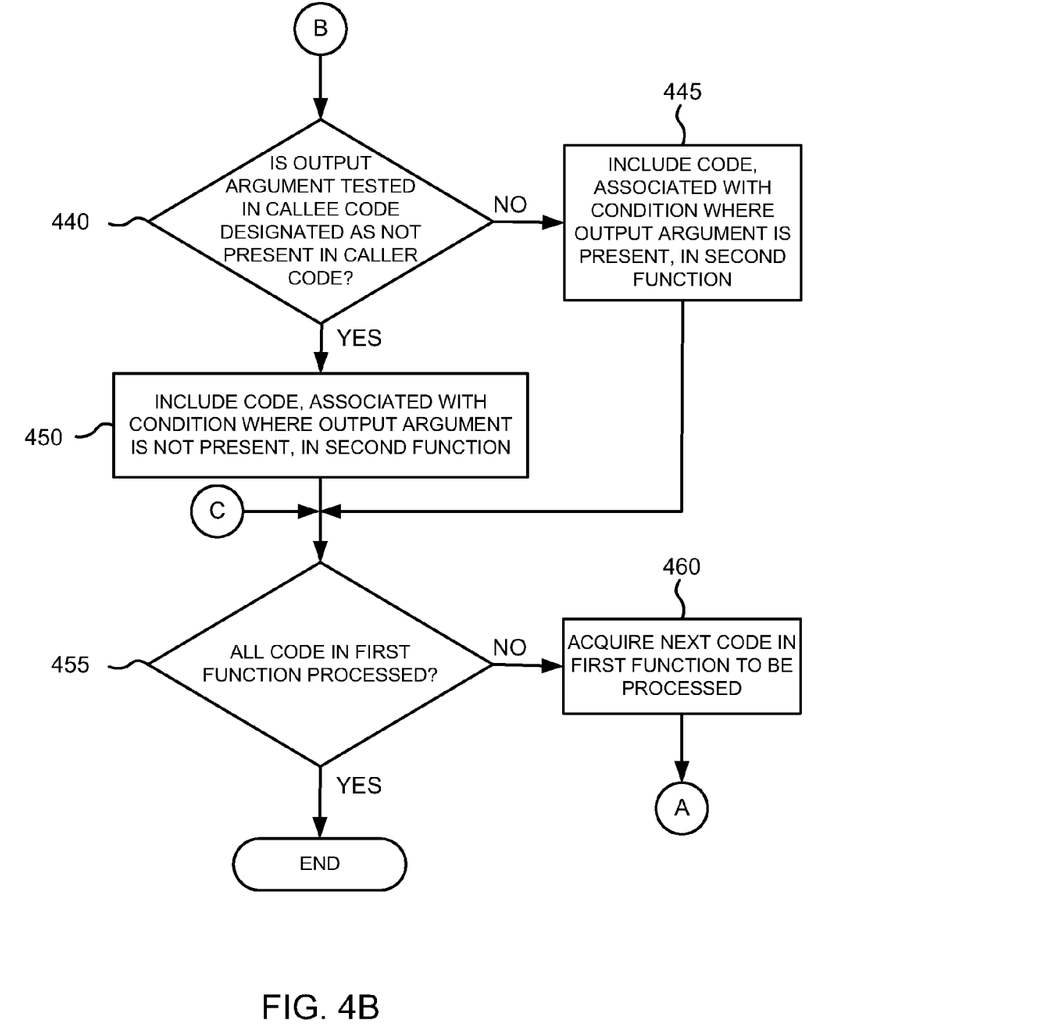

FIGS. 4A-B illustrate a flow chart of example acts that may be used to acquire code that calls a first function and generate a second function based on the first function and the acquired code. Referring to FIG. 4A, at block 420, code that calls a first function with a designator that designates an output argument that is not present (caller code) is acquired. The caller code may be a statement contained, for example, in an application program that may reside in storage (e.g., in a file on a disk, in memory) and the caller code may be acquired by reading the storage (e.g., reading the file, reading memory). Likewise, for example, the caller code may be a statement inputted into a programming environment via a command line interface and acquired by reading the inputted caller statement from the command line interface.

At block 425, code in the first function (callee code) is acquired. The callee code may be acquired, for example, by reading the callee code from storage or reading it from a command line interface. At block 430, a check is performed to determine if the acquired callee code tests whether an output argument is present in the acquired caller code. For example, this act may involve checking the callee code to determine if it contains an operator (e.g., "?") that is used to test whether a particular output argument is present in the caller code.

If the callee code does not perform the above test, at block 435, the callee code is included in a second function. The second function may be code that is generated based on the first function. The second function may be referred to as a "clone" of the first function. At block 455 (FIG. 4B), a check is performed to determine if all of the code in the first function has been processed. If not, at block 460, the next code in the first function to be processed is acquired and control returns to block 430.

If at block 430, the callee code tests whether an output argument is present in the caller code, a check is performed, at block 440, to determine if the output argument designated as not present in the caller code. If not, at block 445, code in the first function associated with the condition where the output argument is present is included in the second function. Otherwise, if, at block 440, the output argument designated as not present in the caller code, at block 450, code in the first function associated with the condition where the output argument is not present are included in the second function.

The check at block 455 is then performed to determine if additional code in the first function is to be processed. If so, code in the first function that is next to be processed is acquired (block 460) and control returns to block 430.

For example, suppose a function named "[C, COMP_RESULT]=ADD_COMPARE (A, B)" is defined to add and compare two input arguments (i.e., A and B) and return two output arguments "C" and "COMP_RESULT" where "C" is the result of the addition and "COMP_RESULT" is the result of the compare. Further suppose that the function "ADD_COMPARE" contains the following statements:

```
IF ?C {
    C = A + B;
}
IF ?COMP_RESULT {
    IF A > B {
        COMP_RESULT = 1;
    } ELSE {
        COMP_RESULT = 0;
    }
}
```

Now referring to FIGS. 1, 2, and 4A-B, suppose that the above "ADD_COMPARE" function is contained in function library 250 and that application program 210 contains the following statement which calls the function:

[C,~]=ADD_COMPARE(*A*,*B*);

Note that the statement calls the function "ADD_COMPARE" with two input variables (i.e., A and B) and an output argument (i.e., C) to hold the result of the addition of the input variables. Note also that the statement designates that the output argument for the result of the compare operation is not present.

The JIT compiler 230 acquires (e.g., reads) the above statement from the application program 210 (block 420). The JIT compiler 230 acquires the "IF ?C" statement in the "ADD_COMPARE" function from the function library 250. The JIT compiler 230 determines if the statement tests whether an output argument is present. Since the statement contains such a test (i.e., "?C"), the JIT compiler 230 determines if the output argument being tested in the statement (i.e., "C") is designated as not present in the statement acquired from the application program 210 (block 440).

Since the statement acquired from the application program 210 indicates the output argument is present, the JIT compiler 230 includes statements associated with the condition where the output argument is present in the generated code 240 (block 445). In this example, the statement "C=A+B;" is included in the generated code 240.

The JIT compiler 230 determines if all of the function's statements have been processed (block 455). Since the function contains additional statements, the JIT compiler acquires the next statement from the function (i.e., "IF ?COMP_RESULT") and determines if this statement tests whether an output argument is designated as not present in the acquired caller statement (block 430).

Since the statement tests whether an output argument is designated as not present (i.e., ?COMP_RESULT), the JIT compiler 230 determines if the output argument being tested in the statement (i.e., "COMP_RESULT") is designated as not present in the statement acquired from the application program 210 (block 440). Since the output argument being tested is designated as not present in the statement acquired from the application program 210, the JIT compiler 230 includes statements in the generated code that are associated with the condition where the output argument is not present (block 450). Note that in this example, no statements are associated with the condition where the output argument is not present, thus, no additional statements would be included in the generated code 240. Note also that, in this example, the statement "IF A>B {COMP_RESULT=1;} ELSE {COMP_RESULT=0;}" is not included in the generated code 240 because this statement is associated with the condition where the output argument "COMP_RESULT" is present.

Figure 5:
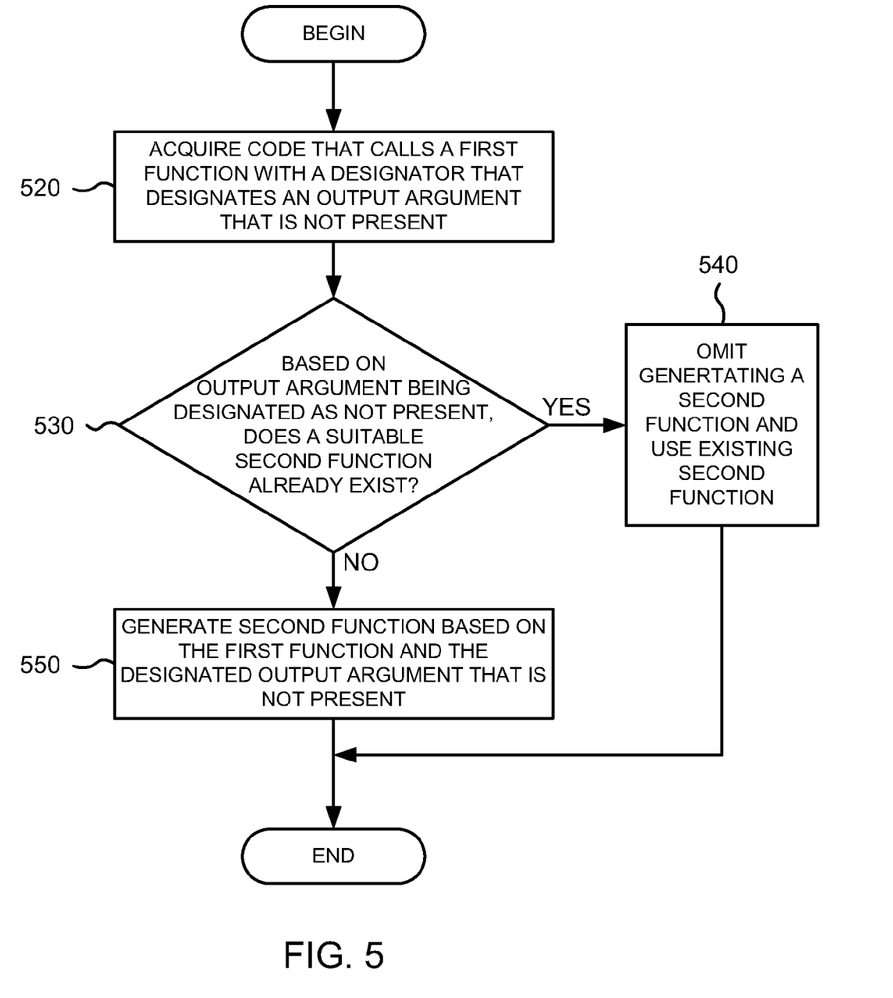
FIG. 5 illustrates a flow chart of example acts that may be used to acquire a statement that calls a first function, determine if a suitable second function exists, and generate a second function or omit generating the second function based on whether a suitable second function already exists.

FIG. 5 illustrates a flow chart of example acts that may be used to acquire a statement that calls a first function, determine if a suitable second function exists, and generate a second function or omit generating the second function based on whether a suitable second function exists.

Referring to FIG. 5, at block 520, code that calls a first function with a designator that designates an output argument that is not present (caller code) is acquired. The caller code may be a statement that is contained, for example, in an application program that resides in storage (e.g., in a file on a disk, in memory) and the caller code may be acquired by reading the storage (e.g., reading the file, reading memory). Likewise, for example, the caller code may be a statement that is inputted into a programming environment via a command line interface and acquired by reading the inputted caller statement from the command line interface.

At block 530, based on the output argument being designated as not present, it is determined whether a suitable generated second function already exists. The second function may be a clone of the first function. The second function may be considered suitable based on various criteria. For example, the second function may be suitable if it was generated based on the first function and the output argument that is designated as not present. Likewise, for example, the second function may be considered suitable even though it may return a value for the output argument that is designated as not present. Here, the caller may ignore the returned value. Note that other criteria or techniques may be used to determine if a suitable second function exists. For example, a suitable function may be determined based on a signature of the call to the first function. Here, the signature of the call of the first function may be compared with signatures of existing second functions to identify a suitable second function.

For example, suppose the above "sort" function is called with the following statement:

[~,*IX*]=sort(*A*);

Given the above statement, the signature for the caller indicates that a variable is supplied for the "index vector" output argument (indicating it is present) and the "sorted A vector" output argument is not present. Now suppose the caller is configured to ignore any value that may be returned by the called "sort" function for the "sorted A vector" output argument. Also, suppose that a second function exists that has a signature that indicates that it returns the "sorted A vector" and the "index vector". The existing second function may be considered a suitable second function for the caller based on the second function's signature, the caller's signature, and the fact that the caller ignores any values that may be returned for the "sorted A vector" output argument.

If at block 530, it is determined that a suitable second function exists, at block 540, generation of a second function is omitted and the suitable second function is used. The second function may be used, for example, by calling the second function. Likewise, for example, the second function may be used by generating code for the caller code based on code contained in the second function.

If at block 530, it is determined that a suitable second function does not exist, at block 550 a second function is generated based on the called function and the output argument that is designated as not present in the caller statement. The second function may be generated as described above. After being generated, the second function may be used as described above.

For example, referring to FIGS. 1, 2, and 5, suppose that application program 210 contains a statement that calls a function in function library 250 that returns a plurality of output arguments. Further suppose that the statement designates that an output argument in the plurality of output arguments is not present.

JIT compiler 230 acquires the statement by reading the statement from the application program 210 (block 520). JIT compiler 230 determines whether a suitable generated function exists based on the output argument that is designated as not present (block 530). Suppose that a suitable generated function exists, the JIT compiler 230 omits generating a second function (that may be generated based on the first function and the output parameter that is designated as not present) and uses the suitable generated function (block 540). The JIT compiler 230 may use the suitable generated function by including statements contained in the suitable generated function in code 240 that is generated from the application program 210.

Now suppose that the JIT compiler 230 determines that a suitable generated function does not exist. The JIT compiler 230 generates a function based on the called function and the output argument that is designated as not present (block 550). The generated function may be included in code 240 that is generated from the application program 210.

Figure 6:
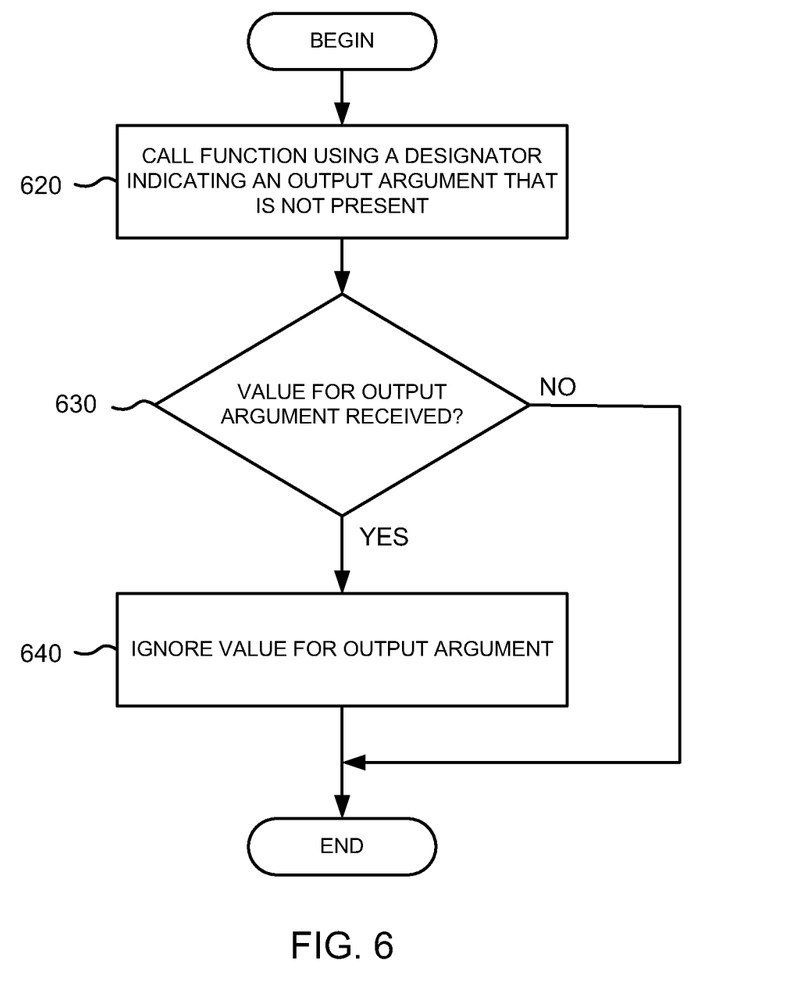
FIG. 6 illustrates a flow chart of example acts that may be used to handle a value returned for an output parameter that is designated as not being present.

FIG. 6 illustrates a flow chart of example acts that may be used to handle a value returned for an output parameter that is designated as not being present. Referring to FIG. 6, at block 620, a function is called using a designator that indicates an output argument that is not present. The function may be called using a statement, such as described above. The statement may include the designator that indicates the output argument that is not present.

At block 630, a check is performed to determine if a value has been received, from the called function, for the output argument that has been designated as not present. If a value is not received, no action is taken. Otherwise, if a value is received, at block 640, the value is ignored. Note that ignoring the value may include freeing resources allocated for the value.

For example, referring to FIGS. 1, 2 and 6, and assume that application program 210 contains a statement that calls a function in function library 250 that returns a plurality of output arguments and the statement contains a designator that designates an output argument in the plurality of output arguments this is not present. Further assume that JIT compiler 230 has processed application program 210 and produced generated code 240, as described above.

Processing logic 120 executes the generated code 240 which calls the function designating the output argument that is not present (block 620). Processing logic 120 executes the function, which returns a value for the output argument. Processing logic 120 executes code in the generated code 240 that determines that the value has been returned (block 630). Processing logic 120 executes code that ignores the returned value (block 640).

Figure 7:
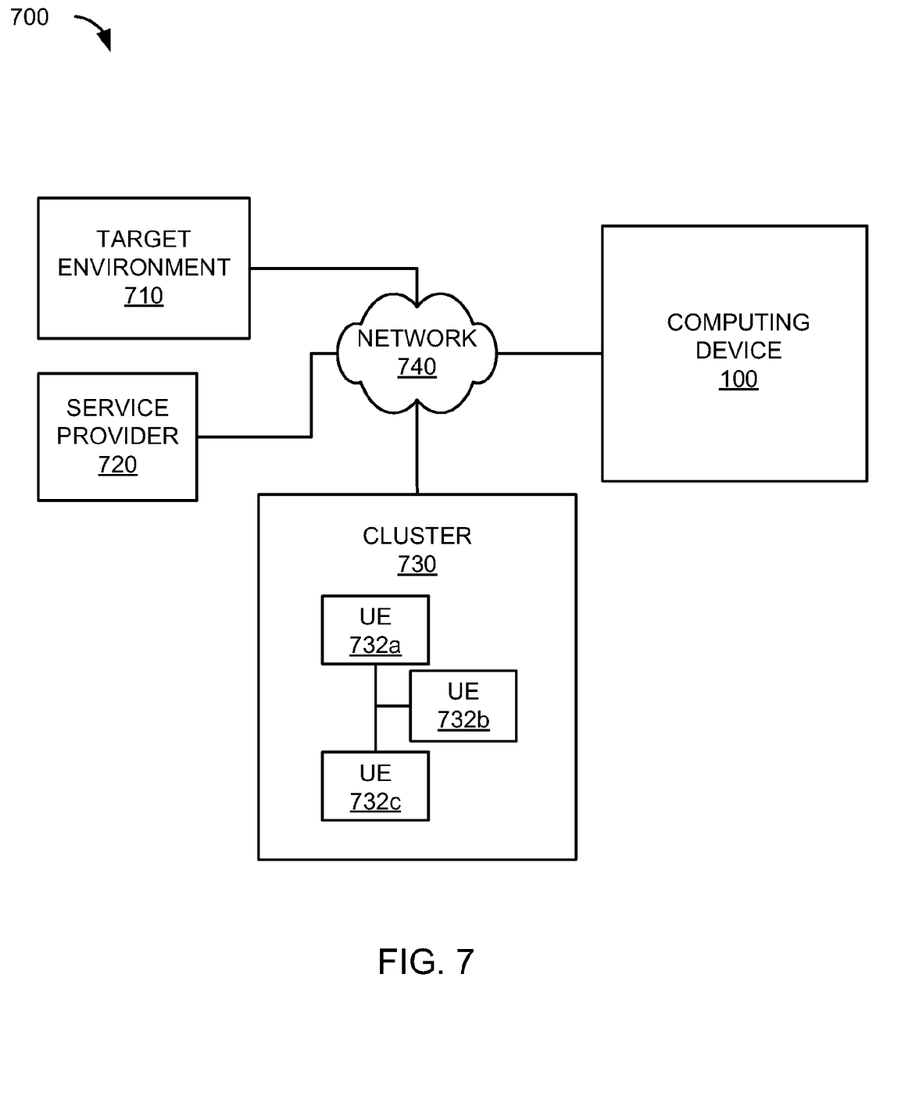
FIG. 7 illustrates an example of a distributed environment that may be used to practice one or more embodiments of the invention.

One or more embodiments of the invention may be implemented in a distributed environment. FIG. 7 illustrates an example of a distributed environment 700 that may be configured to implement one or more embodiments of the invention. Referring to FIG. 7, environment 700 may contain various entities including computing device 100, target environment 710, service provider 720, cluster 730, and network 740. Note that the distributed environment 700 is just one example of a distributed environment that may be used with embodiments of the invention. Other distributed environments that may be used with embodiments of the invention may contain more entities, fewer entities, entities in arrangements that differ from the arrangement illustrated in FIG. 7, and so on. Moreover, the distributed environments may be configured to implement various "cloud computing" frameworks.

Details of computing device 100 were described above with respect to FIG. 1. In distributed environment 700, computing device 100 may be configured to, among other things, exchange information (e.g., data) with other entities in network 740 (e.g., target environment 710, service provider 720, and cluster 730). Computing device 100 may interface with the network 740 via communication interface 180.

Target environment 710 may be configured to execute and/or interpret a compiled version of, for example, application program 210, which may be generated in or otherwise made available to the distributed environment 700. The network 740 may include a communication network capable of exchanging information between the entities in the network 740. The network 740 may include digital and/or analog aspects. The information may include machine-readable information having a format that may be adapted for use, for example, in the network 740 and/or with one or more entities in the network 740. For example, the information may be encapsulated in one or more packets that may be used to transfer the information through the network 740.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 740 may comprise various network devices, such as gateways, routers, switches, firewalls, servers, repeaters, address translators, etc. Portions of the network 740 may be wired (e.g., using wired conductors, optical fibers, etc.) and/or wireless (e.g., using free-space optical (FSO), radio frequency (RF), acoustic transmission paths, etc.). Portions of network 740 may include a substantially open public network, such as the Internet. Portions of the network 740 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

The service provider 720 may include logic that makes a service available to another entity in the distributed environment 700. The service provider 720 may also include a server operated by, for example, an individual, a corporation, an educational institution, a government agency, and so on, that provides one or more services to a destination, such as computing device 100. The services may include software containing computer-executable instructions that implement one or more embodiments of the invention or portions thereof, and may be executed, in whole or in part, by (1) a destination, (2) the service provider 720 on behalf of the destination, or (3) some combination thereof.

For example, in an embodiment, service provider 720 may provide one or more subscription-based services that may be available to various customers. The services may be accessed by a customer via network 740. The customer may access the services using a computer system, such as computing device 100. The services may include services that implement one or more embodiments of the invention or portions thereof. The service provider 720 may limit access to certain services based on, e.g., a customer service agreement between the customer and the service provider 720.

The service agreement may allow the customer to access the services that may allow the customer to build, execute, and/or otherwise process, for example, application program 210, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 730 may include a number of units of execution (UEs) 732 that may perform processing of one or more embodiments of the invention or portions thereof on behalf of computing device 100 and/or another entity, such as service provider 720. The UEs 732 may reside on a single device or chip or on multiple devices or chips. For example, the UEs 732 may be implemented in a single ASIC or in multiple ASICs. Likewise, the UEs 732 may be implemented in a single computer system or multiple computer systems. Other examples of UEs 732 may include FPGAs, CPLDs, ASIPs, processors, multiprocessor systems-on-chip (MPSoCs), graphic processing units, microprocessors, etc. The UEs 732 may be configured to perform operations on behalf of another entity. For example, in an embodiment, the UEs 732 are configured to execute portions of code associated with the programming environment 200. Here, the programming environment 200 may dispatch certain activities pertaining to one or more embodiments of the invention to the UEs 732 for execution. The service provider 720 may configure cluster 730 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 4A-B, 5, and 6, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    acquiring code that includes a call to a first function defined to return a plurality of output arguments, the call to the first function designating, with a designator, one or more output arguments, in the plurality of output arguments of the first function, that are not present; and
    generating, using processing logic, a second function based at least on the designated one or more output arguments being designated as not present.

2. The method of claim 1 wherein the second function includes code or excludes code contained in the first function based at least on the designated one or more output arguments being designated as not present.

3. The method of claim 1 wherein the first function contains an expression or a statement that tests the designated one or more output arguments to determine whether the designated one or more output arguments are designated as not being present.

4. The method of claim 3 wherein the expression or the statement includes one or more values which identify the designated one or more arguments.

5. The method of claim 4 wherein the one or more values is
    a name associated with the designated one or more output arguments or
    a number that represents an ordinal position associated with the designated one or more output arguments.

6. The method of claim 3 wherein the expression or the statement includes an operator that indicates that the designated one or more output arguments are to be tested to determine if the designated one or more output arguments are designated as being not present.

7. The method of claim 1 further comprising:
    evaluating an expression in the first function that tests for whether the designated one or more output arguments are designated as not present; and
    including or excluding code in the second function based on an outcome of the evaluation of the expression.

8. The method of claim 1 further comprising:
    calling a routine that tests for whether the designated one or more output arguments are designated as not being present; and
    including or excluding code in the second function based on an outcome of the evaluation of the expression.

9. The method of claim 1 wherein the designator is a tilde character.

10. A method comprising:
acquiring code that includes a call to a first function defined to return a plurality of output arguments, the call to the first function designating, with a designator, one or more output arguments, in the plurality of output arguments of the first function, that are not present;
determining whether a second function already exists based at least on the designated one or more output arguments being designated as not present; and
omitting, using processing logic, the generation of the second function if the second function already exists.

11. The method of claim 10 further comprising:
generating the second function based at least on the designated one or more output arguments being designated as not being present if the second function does not already exist.

12. The method of claim 10 wherein determining whether the second function already exists further comprises:
determining, based at least on a signature of the call to the first function, whether the second function already exists.

13. A method comprising:
calling a function defined to return a plurality of output arguments, the call to the function designating, with a designator, one or more output arguments, in the plurality of output arguments, that are not present;
receiving one or more values for the designated one or more output arguments; and
ignoring, using processing logic, the received one or more values for the designated one or more output arguments.

14. One or more non-transitory computer-readable storage media for storing computer-executable instructions executable by processing logic, the media storing one or more instructions for:
acquiring code that includes a call to a first function defined to return a plurality of output arguments, the call to the first function designating, with a designator, one or more output arguments, in the plurality of output arguments of the first function, that are not present; and
generating a second function based at least on the designated one or more output arguments being designated as not present.

15. The media of claim 14 wherein the second function includes code or excludes code contained in the first function based at least on the designated one or more output arguments.

16. The media of claim 14 further storing one or more instructions for:
evaluating an expression, in the first function, that tests for whether the designated one or more output arguments are present; and
including or excluding code in the second function based on an outcome of the evaluation of the expression.

17. One or more non-transitory computer-readable storage media for storing computer-executable instructions executable by processing logic, the media storing one or more instructions for:
acquiring code that includes a call to a first function defined to return a plurality of output arguments, the call to the first function designating, with a designator, one or more output arguments, in the plurality of output arguments of the first function, that are not present;
determining whether a second function already exists based at least on the designated one or more output arguments being designated as not being present; and
omitting, using processing logic, the generation of the second function if the second function already exists.

18. The media of claim 17 further storing one or more instructions for:
determining, based at least on a signature of the call to the first function, whether the second function already exists.

19. An apparatus comprising:
means for acquiring code that includes a call to a first function defined to return a plurality of output arguments, the call to the first function designating, with a designator, one or more output arguments of the first function, in the plurality of output arguments, that are not present; and
means for generating a second function based at least on the designated one or more output arguments being designated as not present.

20. A system comprising:
a memory storing code that includes a call to a first function defined to return a plurality of output arguments, the call to the first function designating, with a designator, one or more output arguments of the first function, in the plurality of output arguments, that are not present, and
processing logic coupled to the memory, the processing logic configured to:
generate a second function based at least on the designated one or more output arguments of the first function being designated with the designator as not present.

21. The method of claim 1 wherein the one or more output arguments designated with the designator as not present is either:
not returned by the first function, or
ignored by the acquiring code.

22. The method of claim 10 wherein the one or more output arguments designated with the designator as not present is either:
not returned by the first function, or
ignored by the acquiring code.

23. The media of claim 14 wherein the one or more output arguments designated with the designator as not present is either:
not returned by the first function, or
ignored by the acquiring code.

24. The media of claim 17 wherein the one or more output arguments designated with the designator as not present is either:
not returned by the first function, or
ignored by the acquiring code.

25. The apparatus of claim 19 wherein the one or more output arguments designated with the designator as not present is either:
not returned by the first function, or
ignored by the means for acquiring code.

26. The system of claim 20 wherein the one or more output arguments designated with the designator as not present is either:
not returned by the first function, or
ignored by the code stored in the memory.

27. An apparatus comprising:
a memory storing code that includes a call to a first function defined to return a plurality of output arguments, the call to the first function designating, with a designator, one or more output arguments, in the plurality of output arguments of the first function, that are not returned by the first function; and processing logic coupled to the memory, the processing logic configured to generate a second function based on the designated one or more output arguments being designated as not returned, wherein
the first function includes an expression or a statement that tests the designated one or more output arguments to determine whether the designated one or more output arguments are designated as not returned, and
the second function either includes code or excludes code from the first function based on the designated one or more output arguments being designated as not returned.

* * * * *